United States Patent
Shete et al.

(10) Patent No.: US 12,395,946 B2
(45) Date of Patent: Aug. 19, 2025

(54) POWER CONTROL FOR FLYING BASE STATION

(71) Applicant: RAKUTEN MOBILE, INC., Tokyo (JP)

(72) Inventors: Pankaj Shete, Tokyo (JP); Awn Muhammad, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/921,352

(22) PCT Filed: Nov. 11, 2021

(86) PCT No.: PCT/JP2021/041640
§ 371 (c)(1),
(2) Date: Oct. 26, 2022

(87) PCT Pub. No.: WO2023/013090
PCT Pub. Date: Feb. 9, 2023

(65) Prior Publication Data
US 2024/0397444 A1    Nov. 28, 2024

(30) Foreign Application Priority Data
Aug. 2, 2021    (JP) ................................. 2021-126679

(51) Int. Cl.
*H04W 52/34*    (2009.01)
*H04W 52/02*    (2009.01)
(Continued)

(52) U.S. Cl.
CPC ..... *H04W 52/346* (2013.01); *H04W 52/0277* (2013.01); *H04W 52/241* (2013.01); *H04W 52/265* (2013.01); *H04W 52/281* (2013.01)

(58) Field of Classification Search
CPC ........... H04W 52/346; H04W 52/0277; H04W 52/241; H04W 52/265; H04W 52/281;
(Continued)

(56) References Cited

U.S. PATENT DOCUMENTS 5,625,868 A    4/1997   Jan et al.
2013/0210424 A1*    8/2013   Boustie .............. H04B 7/18563
                                                              455/427

(Continued)

FOREIGN PATENT DOCUMENTS

EP    0805568 B1    1/1999
JP    2008278004 A    11/2008
(Continued)

OTHER PUBLICATIONS

Office Action in JP Application No. 2023-539600, mailed Aug. 27, 2024, 5pp.

*Primary Examiner* — Eugene Yun
(74) *Attorney, Agent, or Firm* — HAUPTMAN HAM, LLP

(57) ABSTRACT

A communication control apparatus for a communication system with a ground station, which is at least partly installed on the ground and can communicate with a communication device, and a flying base station, which can communicate with the ground station, includes: an available power estimation unit to estimate available power of the flying base station; a required total power estimation unit to estimate total power required by the flying base station for communication with each communication device connected to the ground station; and a communication mode change unit to change communication mode between at least one communication device and the flying base station, at least when the total power is more than the available power, so that the total power becomes less than the available power.

11 Claims, 6 Drawing Sheets

(51) Int. Cl.
*H04W 52/24* (2009.01)
*H04W 52/26* (2009.01)
*H04W 52/28* (2009.01)

(58) Field of Classification Search
CPC ..... H04W 24/02; H04W 52/30; H04W 84/06;
H04W 88/06; H04W 88/08; H04W 88/16;
H04B 7/18504; H04B 7/185
USPC ........................................................ 455/522
See application file for complete search history.

(56) References Cited

U.S. PATENT DOCUMENTS

| | | | |
|---|---|---|---|
| 2016/0157075 A1* | 6/2016 | Ho | H04W 56/0015 455/404.1 |
| 2019/0075468 A1 | 3/2019 | Fujii | |
| 2020/0077405 A1* | 3/2020 | Zhang | H04L 25/0224 |
| 2021/0385879 A1* | 12/2021 | Mahalingam | H04W 56/0045 |

FOREIGN PATENT DOCUMENTS

| | | | |
|---|---|---|---|
| JP | 2010278886 A | 12/2010 |
| JP | 2014087045 A | 5/2014 |
| JP | 2015035815 A | 2/2015 |
| JP | 2017168897 A | 9/2017 |
| WO | 2014030447 A1 | 2/2014 |

\* cited by examiner

POWER CONTROL FOR FLYING BASE STATION

RELATED APPLICATIONS

The present application is a National Phase of International Application No. PCT/JP2021/041640, filed Nov. 11, 2021, and claims priority based on Japanese Patent Application No. 2021-126679, filed Aug. 2, 2021.

BACKGROUND OF THE INVENTION

1. Field of the Invention

The present disclosure relates to communication control technology in communication system.

2. Description of the Related Art

The number, types, and applications of wireless communication devices, represented by smartphones and Internet of Things (IoT) devices, continue to increase, and wireless communication standards continue to be expanded and improved. For example, the commercial service of the fifth generation mobile communication system known as "5G" started in 2018, and the standards are still being developed by the 3GPP (Third Generation Partnership Project). Efforts are also underway to develop standards for "6G" or the sixth generation mobile communication system, which would be the next generation of wireless communication standards following 5G.

Mobile communication networks for mobile or portable communication devices such as smartphones and cell phones (hereinafter collectively referred to as "communication device(s)") are usually constructed by communication cells (hereinafter referred to as "terrestrial communication cell(s)") provided by base stations installed on the ground (hereinafter referred to as "terrestrial base station(s)"). However, in some areas, it was difficult to install a sufficient number of terrestrial base stations for various reasons, resulting in a relatively low quality of mobile communications.

In order to solve the issue of the disparity in mobile communication quality among different regions and the so-called "out-of-range" issue, where mobile communication devices cannot communicate in some regions, non-terrestrial networks (NTN) have been considered. In NTN, communication satellites or unmanned aircrafts flying in outer space or the atmosphere, such as the stratosphere, are used as base stations (hereinafter referred to as flying base station(s), and especially communication satellites are referred to as satellite base station(s)). The flying base station provides a communication cell on the ground (hereinafter referred to as flying communication cell(s), and especially communication cells provided by communication satellites are referred to as satellite communication cell(s)). A communication device in a flying communication cell communicates with a flying base station directly or indirectly via other communication devices. By providing flying communication cells in areas where terrestrial communication cells are not sufficient, the quality of mobile communication in such areas can be improved.

Patent Literature 1: JP-A-2010-278886

SUMMARY OF THE INVENTION

Flying base stations, such as communication satellites and unmanned aircrafts, communicate with many communication devices on the ground using power generated by solar cells or solar panels receiving sunlight, power stored in batteries, and the like. Although solar power generation can be sufficient for a standard or normal communication volume, the amount of power generated by sunlight varies greatly depending on the location and ephemeris of the flying base station, and the number of communication devices communicating with the flying base station and the communication volume also varies greatly depending on the time and area. It is extremely important to efficiently use the limited power of the flying base station under such highly uncertain circumstances, and the present disclosure has been completed.

The present disclosure was made in view of such circumstances, and the purpose thereof is to provide a communication control apparatus and the like that can efficiently use the power of a flying base station.

In order to solve the above-described issue, a communication control apparatus in a certain aspect of the present disclosure for a communication system with a ground station, which is at least partly installed on the ground and can communicate with a communication device, and a flying base station, which can communicate with the ground station, includes: an available power estimation unit to estimate available power of the flying base station; a required total power estimation unit to estimate total power required by the flying base station for communication with each communication device connected to the ground station; and a communication mode change unit to change communication mode between at least one communication device and the flying base station, at least when the total power is more than the available power, so that the total power becomes less than the available power.

According to the aspect, when the total power required by the flying base station for communication with each communication device on the ground is more than the available power of the flying base station, the communication mode change unit changes the communication mode between at least one communication device and the flying base station to reduce the required total power below the available power, so that the power of the flying base station can be used efficiently.

Another aspect of the present disclosure is a communication control method. The communication control method for a communication system with a ground station, which is at least partly installed on the ground and can communicate with a communication device, and a flying base station, which can communicate with the ground station, includes: estimating available power of the flying base station; estimating total power required by the flying base station for communication with each communication device connected to the ground station; and changing communication mode between at least one communication device and the flying base station, at least when the total power is more than the available power, so that the total power becomes less than the available power.

In addition, any combination of the above components, and any conversion of the expression of the present disclosure among methods, devices, systems, recording media, computer programs, and the like, is also valid as a form of the present disclosure.

According to the present disclosure, the power of the flying base station can be used efficiently.

DETAILED DESCRIPTION OF THE INVENTION

Figure 1:
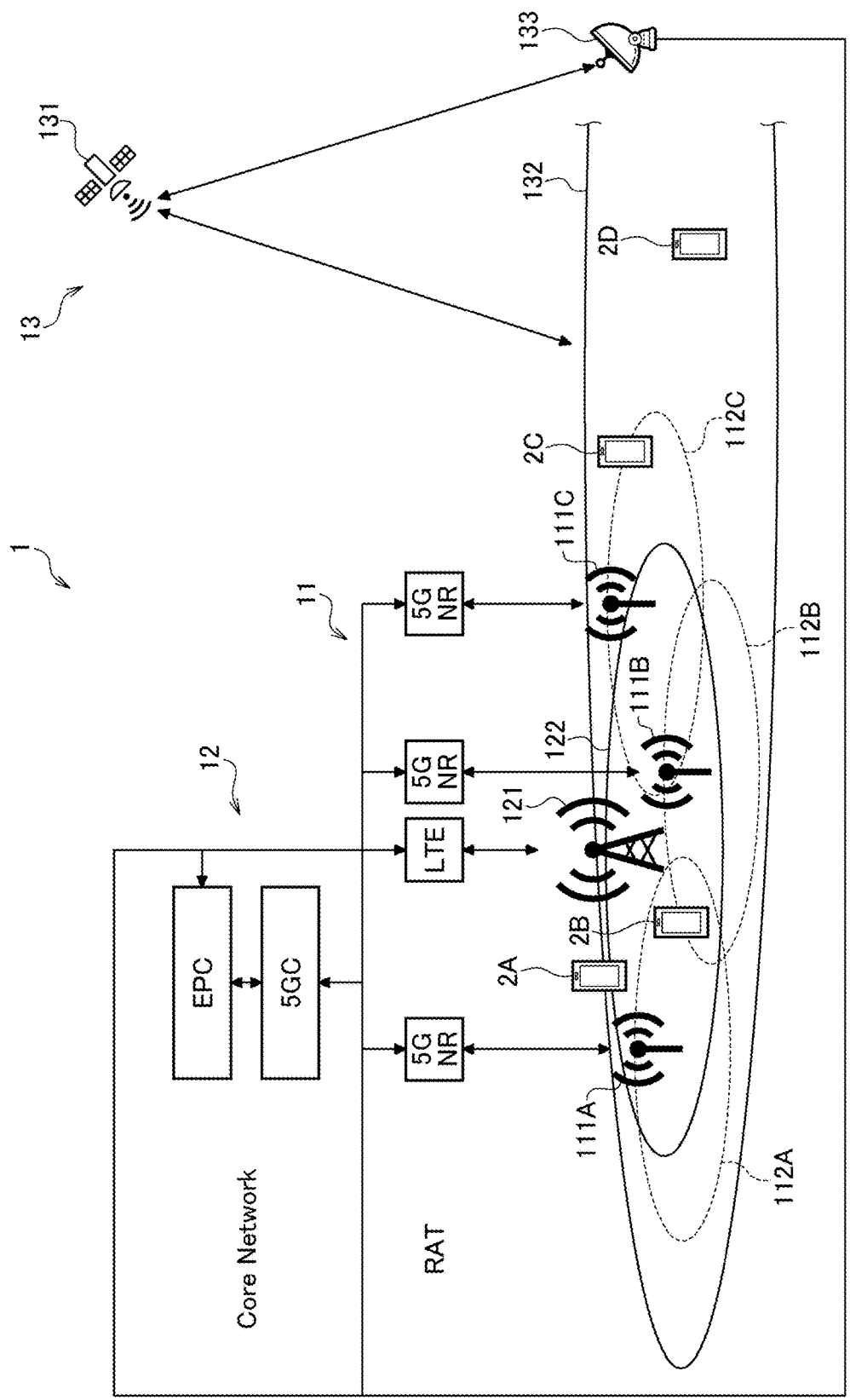
FIG. 1 schematically shows the overview of a wireless communication system to which the communication control apparatus is applied.

FIG. 1 schematically shows an overview of a wireless communication system 1 to which the communication control apparatus according to an embodiment of the present disclosure is applied. The wireless communication system 1 includes 5G wireless communication system 11, 4G wireless communication system 12, and satellite communication system 13. 5G wireless communication system 11 that complies with the fifth generation mobile communication system (5G) uses NR (New Radio) or 5G NR (Fifth Generation New Radio) as the radio access technology (RAT) and 5GC (Fifth Generation Core) as the core network. 4G wireless communication system 12 that complies with the fourth generation mobile communication system (4G) uses LTE (Long Term Evolution) or LTE-Advanced as the radio access technology and EPC (Evolved Packet Core) as the core network. Satellite communication system 13 is for satellite communication via communication satellite 131. Although not shown in the figure, the wireless communication system 1 may include wireless communication networks of a generation prior to 4G, a generation later than 5G (e.g. 6G), or any wireless communication networks that are not associated with generations, such as Wi-Fi (registered trademark).

The 5G wireless communication system 11 may include a plurality of 5G base stations 111A, 111B and 111C (hereinafter collectively referred to as 5G base station 111) installed on the ground capable of communicating by 5G NR with communicators or communication devices 2A, 2B, 2C and 2D (hereinafter collectively referred to as communication device(s) 2) such as smartphones, which are also referred to as UE (User Equipment). 5G base station 111 is also referred to as gNodeB (gNB). The coverage or support range of each 5G base station 111A, 111B and 111C is referred to as a cell 112A, 112B and 112C (hereinafter collectively referred to as 5G cell 112 or cell 112).

The size of the 5G cell 112 of each 5G base station 111 is arbitrary; however, typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For the reason, 5G tends to use more small cells than 4G and earlier generations.

The communication device 2 can conduct 5G communication when it is located within at least one of a plurality of 5G cells 112A, 112B and 112C. In the example shown in the figure, communication device 2B in 5G cells 112A and 112B can communicate with both 5G base stations 111A and 111B by 5G NR. In addition, the communication device 2C in the 5G cell 112C can communicate with the 5G base station 111C by 5G NR. Communication devices 2A and 2D are outside of all 5G cells 112A, 112B and 112C, so they are not able to communicate by 5G NR. The 5G NR-based 5G communication between each communication device 2 and each 5G base station 111 is managed by the 5GC, which is the core network. For example, the 5GC transfers data to and from each 5G base station 111, transfers data to and from external networks such as the EPC, the satellite communication system 13 and the Internet, and manages the movement of the communication device 2, and the like.

The 4G wireless communication system 12 includes a plurality of 4G base stations 121 (only one of them is shown in FIG. 1) installed on the ground that can communicate with the communication device 2 by LTE or LTE-Advanced. The base station 121 in 4G is referred to as eNodeB (eNB). Similarly to each 5G base station 111, the communication range or support range of each 4G base station 121 is also called a cell and is shown as 122.

The communication device 2 can perform 4G communication when it is located within 4G cell 122. In the example shown in the figure, the communication devices 2A and 2B in the 4G cell 122 can communicate with the 4G base station 121 by LTE or LTE-Advanced. Communication devices 2C and 2D are outside the 4G cell 122 and are not able to communicate by LTE or LTE-Advanced. The 4G communication by LTE and LTE-Advanced between each communication device 2 and each 4G base station 121 is managed by the EPC, which is the core network. For example, the EPC manages the transfer of data to and from each 4G base station 121, the transfer of data to and from external networks such as 5GC, the satellite communication system 13 and the Internet, and the movement management of the communication device 2.

If we take a look at each communication device 2A, 2B, 2C and 2D in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations (111A, 111B and 121) as in the case of communication device 2B, one base station is selected as the most suitable for the communication device 2B in terms of communication quality and the like, under the control of the 5GC and/or the EPC, which is the core network. For the communication device 2D that is not in a state that enables 5G communication with any 5G base station 111 or 4G communication with any 4G base station 121, the communication is conducted using the satellite communication system 13 described below.

The satellite communication system 13 is the wireless communication system using communication satellites 131 as flying base stations. The communication satellites 131 are low-earth-orbit satellites flying in low-earth-orbit outer space of 500 to 700 km above the ground. Similarly to 5G base station 111 and 4G base station 121, the communication range or support range of each communication satellite 131 is also called a cell and is shown as 132. Thus, a communication satellite 131 as a flying base station provides a satellite communication cell 132 as a flying communication cell onto the ground. Communication device 2 on the ground can conduct satellite communication when it is inside the satellite communication cell 132. Similarly to 5G base station 111 in the 5G wireless communication system 11 and 4G base station 121 in the 4G wireless communication system 12, communication satellite 131 as the base station in the satellite communication system 13 is capable of wireless communication directly or indirectly via aircraft and the like with the communication device 2 within the satellite communication cell 132. The radio access technology used by the communication satellite 131 for wireless communication with the communication device 2 in the satellite communication cell 132 may be 5G NR, the same as the 5G base station 111, or LTE or LTE-Advanced, the same as the 4G base station 121, or any other radio access technology that the communication device 2 can use. Therefore, there is no need for the communication device 2 to have any special functions or components for satellite communication.

The satellite communication system 13 includes a gateway 133 as a ground station that is installed on the ground and can communicate with the communication satellite 131. The gateway 133 is equipped with a satellite antenna to communicate with the communication satellite 131, and is connected to the 5G base station 111 and the 4G base station 121 as terrestrial base stations that constitute the terrestrial network (TN). In such a manner, the gateway 133 connects the non-terrestrial network (NTN), which includes communication satellites 131, and the terrestrial network TN, which includes terrestrial base stations 111 and 121, for mutual communication. When the communication satellite 131 conducts 5G communication with the communication device 2 in the satellite communication cell 132 by 5G NR, the 5GC connected via the gateway 133 and the 5G base station 111 in the TN (or the 5G radio access network) is used as the core network. When the communication satellite 131 conducts 4G communication with the communication device 2 in the satellite communication cell 132 by LTE or LTE-Advanced, the EPC connected via the gateway 133 and the 4G base station 121 in the TN (or the 4G radio access network) is used as the core network. In such a manner, appropriate coordination is made between different wireless communication systems such as 5G wireless communication system 11, 4G wireless communication system 12, satellite communication system 13 and the like through the gateway 133.

Satellite communication by communication satellites 131 is mainly used for covering areas with no or few terrestrial base stations such as 5G base stations 111 and 4G base stations 121 and the like. In the example shown in the figure, a communication device 2D that is outside the communication cells of all the terrestrial base stations communicates with the communication satellite 131. On the other hand, communication devices 2A, 2B and 2C that are in good communication with either of the terrestrial base stations, are also in the satellite communication cell 132 and can communicate with the communication satellite 131. However, by communicating with the terrestrial base stations instead of the communication satellite 131 as the satellite base station in principle, the limited communication resources (including power) of the communication satellite 131 are saved for the communication device 2D and the like. The communication satellite 131 uses beamforming to direct the communication radio wave to the communication device 2D in the satellite communication cell 132, thereby the communication quality with the communication device 2D is improved.

The size of the satellite communication cell 132 of the communication satellite 131 as a satellite base station depends on the number of beams emitted by the communication satellite 131. For example, a satellite communication cell 132 with a diameter of approximately 24 km can be formed by combining up to 2,800 beams. As illustrated, a satellite communication cell 132 is typically larger than a terrestrial communication cell such as a 5G cell 112 or a 4G cell 122, and could contain one or more 5G cells 112 and/or 4G cells 122 inside it. The above example shows a communication satellite 131 flying in low-earth-orbit outer space at a height of approximately 500 km to 700 km above the ground as a flying flying base station. However, a communication satellite flying in geostationary orbit or other higher orbit in outer space, or an unmanned or manned aircraft flying in stratosphere or other lower (e.g. approximately 20 km above the ground) atmosphere may be used as a flying base station in addition to or instead of the communication satellite 131.

Figure 2:
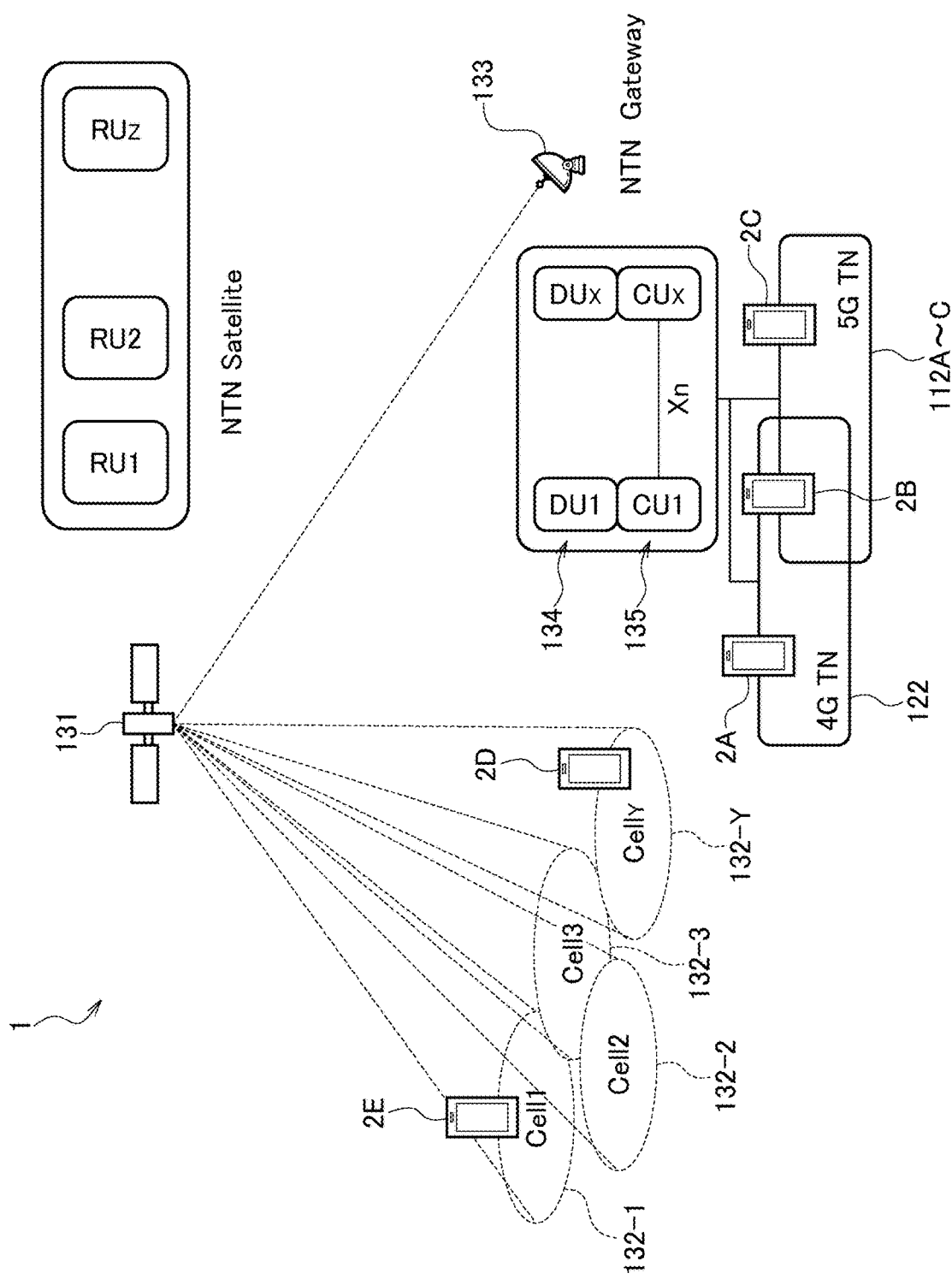
FIG. 2 schematically shows the wireless communication system with a communication satellite.

FIG. 2 shows a schematic of the same wireless communication system 1 as in FIG. 1, with the communication satellite 131 in focus. As mentioned above, communication satellite 131 can combine up to 2,800 beams to create one or more satellite communication cells 132 on the ground. In the example in FIG. 2, a total of Y satellite communication cells 132-1 to 132-Y (hereinafter collectively referred to as satellite communication cell 132) are formed on the ground by the communication satellite 131. The Communication device 2D in FIG. 1, which could not communicate with 5G base station 111 and 4G base station 121 and could communicate only with the communication satellite 131 is shown in FIG. 2 within the Y-th satellite communication cell 132-Y. Another communication device 2E is shown schematically within the first satellite communication cell 132-1. Through the NTN including the communication satellite 131 and gateway 133 and the like, the communication devices (2D, 2E and the like) in any of the satellite communication cells 132 perform 5G communication and/or 4G communication with communication devices in remote TNs (2A, 2B, 2C and the like), and/or, perform communication with any other communication devices via 5GC and/or EPC as core network.

Communication satellite 131 includes any number (Z in the example in FIG. 2) of radio units $RU_1$ to $RU_z$ responsible for forming the satellite communication cell 132, wireless communication with communication devices (2D, 2E and the like) located within the satellite communication cell 132, and wireless communication with the gateway 133 and the like. The Gateway 133 connecting NTNs and TNs for mutual communication 133 includes a satellite antenna for communication with communication satellite 131, and distributed unit group 134 and central unit group 135 as a portion or node of RAN (Radio Access Network) including the terrestrial base stations 111, 121 of TNs.

In the example in FIG. 2, distributed unit group 134 is equipped with X distributed units and central unit group 135 is equipped with X central units. The X pairs of distributed unit and central unit realize respective baseband functions of X terrestrial base stations 111, 121 connected to the gateway 133. All or portion of the baseband functions may be provided in the respective terrestrial base stations 111, 121 themselves and/or relay facilities or other equipment between the respective terrestrial base stations 111, 121 and the gateway 133, instead of being provided in the gateway 133. In such a case, the gateway 133 would contain, in addition to the satellite antenna that interfaces with the NTN, only a simple interface function with the RAN of the TN.

X distributed units in the distributed unit group 134 of the gateway 133 are connected with the same number of X terrestrial base stations 111, 121. In FIG. 2, four terrestrial communication cells 112, 122 are illustrated in total: three of which are the three 5G cells 112A, 112B and 112C as the terrestrial communication cells provided by the three 5G base stations 111A, 111B and 111C in FIG. 1; and one of which is the one 4G cell 122 as the terrestrial communication cell provided by the one 4G base station 121 in FIG. 1. Each of the three 5G base stations 111A-111C is connected one-to-one with either of the X distributed units in the distributed unit group 134 of the gateway 133. One 4G base station 121 is also connected one-to-one with either of the X distributed units (which is not connected with the 5G base station 111A-111C) in the distributed unit group 134 of the gateway 133. It should be noted that since the concept of "distributed unit" and "central unit" did not exist in the 4G (and prior generation) wireless communication standards, the functions (baseband functions) performed by the units may actually be provided in the gateway 133 as similar functional unit (baseband unit) for 4G base station 121, or provided in 4G base station 121 itself as described above.

Each of the X central units in the central unit group 135 of the gateway 133 is connected one-to-one with the same number of X distributed units. Similar to the distributed units described above, the function of the central unit for 4G base station 121 may be provided in the gateway 133 as similar functional unit for 4G base station 121 or provided in 4G base station 121 itself. The central units corresponding to 5G base stations 111A-111C are connected to the 5GC as CN via the 5G radio access network (5G RAN) of the 5G wireless communication systems 11. The similar functional unit to central unit corresponding to 4G base station 121 is connected to the EPC as CN via the 4G radio access network (4G RAN) of the 4G wireless communication systems 12.

Thus, the gateway 133, which interfaces with both of the 5G wireless communication system 11 and the 4G wireless communication system 12, is connected to different CNs for each generation or standard. However, as described with respect to FIG. 1, the gateway 133 makes appropriate coordination among different CNs (5GC and EPC), thereby it can properly connect with wireless communication systems of different generations and standards. Note that the gateway 133 may be equipped with the function of interfacing only with a terrestrial wireless communication system of a particular generation or standard, such as the 5G wireless communication system 11. In the case, the distributed unit group 134 of the gateway 133 is equipped with the same number of distributed units as 5G base stations (111A-111C and the like) to be connected, and central unit group 135 is equipped with the same number of central units as 5G base stations and distributed units.

In the example of FIG. 2, the distributed unit group 134 of gateway 133 is connected with the three 5G base stations 111A-111C that constitute the terrestrial network "5G TN" by the 5G wireless communication system 11 and connected with the one 4G base stations 121 that constitutes the terrestrial network "4G TN" by the 4G wireless communication system 12. As in FIG. 1, the communications devices 2B and 2C exist within 5G cells 112A-112C provided by the 5G base stations 111A-111C, and the communications devices 2A and 2B exist within 4G cell 122 provided by the 4G base station 121. It should be noted that the distributed unit group 134 of the gateway 133 may be connected with other TNs and terrestrial base stations (not shown), and other communication devices (not shown) may be present within each TN.

Gateway 133, as described above, is at least partly installed on the ground, and constitutes a ground station capable of communicating with communication devices (2A-2C and the like) within the connected TNs. The communication satellite 131 constitutes a flying base station that can communicate with the gateway 133 as a ground station. Gateway 133 as a ground station connects the terrestrial base stations (111A-111C, 121 and the like) and the communication satellite 131 to establish communication between the communication devices (2A-2C and the like) connected to the terrestrial base station and the communication satellite 131. In addition, the communication devices in the satellite communication cell 132 provided by the communication satellite 131 (2D, 2E and the like) can communicate with the communication devices (2A-2C and the like) connected to gateway 133, via the communications satellite 131 and the gateway 133.

Figure 3:
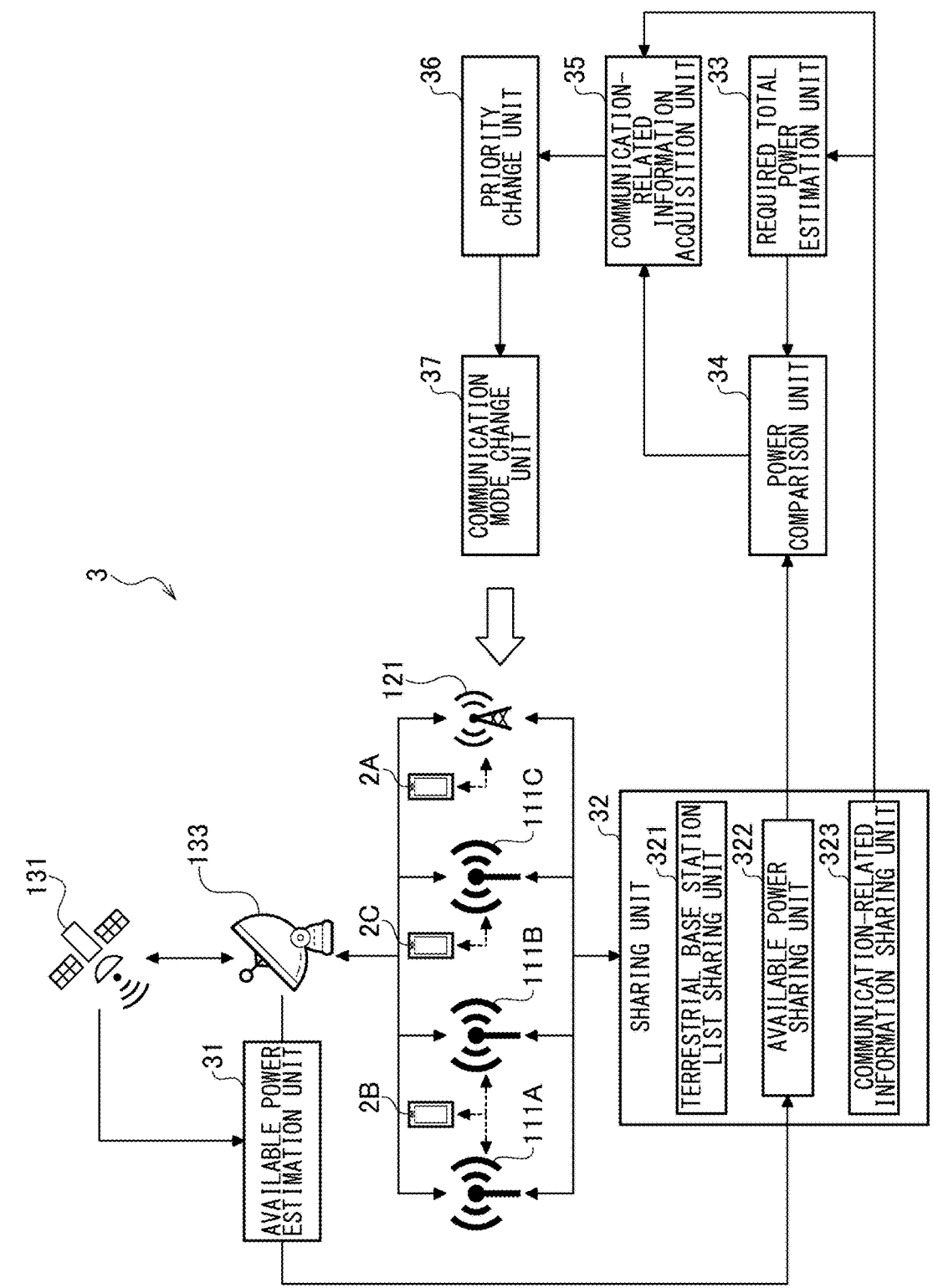
FIG. 3 is a functional block diagram of the communication control apparatus.

FIG. 3 is a functional block diagram of the communication control apparatus 3 according to an embodiment of the present disclosure. The communication control apparatus 3 includes an available power estimation unit 31, a sharing unit 32, a required total power estimation unit 33, a power comparison unit 34, a communication-related information acquisition unit 35, priority change unit 36 and a communication mode change unit 37. The functional blocks are realized by the cooperation of hardware resources, such as the central processing unit, memory, input devices, output devices, and peripheral devices connected to the computer, and software that is executed using them. Regardless of the type of computer or the installation location, each of the above functional blocks may be realized with the hardware resources of a single computer, or by combining hardware resources distributed across multiple computers. Especially in the embodiment, some or all of functional blocks of the communication control apparatus 3 may be realized in computer and/or processor provided in the communication satellite 131, the gateway 133, each terrestrial base station (111A-111C, 121 and the like) and/or the communication device (2A-2C and the like).

The available power estimation unit 31 estimates the available power of the communication satellite 131 as a flying base station based on ephemeris information of the communication satellite 131. The available power estimation unit 31 is preferably provided in the gateway 133, and the communication satellite 131 transmits its own ephemeris information to the gateway 133 continuously or periodically.

The available power estimation unit 31 in the gateway 133 is responsible for estimating the amount of power generated by the solar panels installed on the communication satellite 131 based on sunlight, based on the ephemeris information received from the communication satellite 131, information regarding the activity of the sun which is known to change periodically, and information regarding the condition of the space in which the communication satellite 131 flies and the like. If the communication satellite 131 is equipped with a battery that stores power, the communication satellite 131 will report the amount of charged power or amount of dischargeable power of the battery to the gateway 133. In such a case, the sum of the amount of power generated by the solar panels and the amount of charged power of the battery is estimated by the available power estimation unit 31 as the available power of the communication satellite 131.

The sharing unit 32 includes a terrestrial base station list sharing unit 321, an available power sharing unit 322, and a communication-related information sharing unit 323. The terrestrial base station list sharing unit 321 is used to share a list of terrestrial base stations connected to the communication satellite 131 via the gateway 133 among such terrestrial base stations as information associated with the communication satellite 131. In the example in FIG. 3, the gateway 133 is connected with the three 5G base stations 111A-111C and the one 4G base station 121, and the list of the four terrestrial base stations 111A-111C and 121 is shared among the four terrestrial base stations 111A-111C and 121. This allows each terrestrial base station 111A-111C and 121 to recognize other terrestrial base station 111A-111C and 121 connected to the gateway 133 and the communications satellite 131. The list of terrestrial base stations is preferably included in information associated with the communication satellite 131, for example, the satellite ID or satellite identification information of the communication satellite 131 that is generated during cell configuration. Such satellite ID is shared among the terrestrial base station 111A-111C and 121.

In the so-called "transparent" gateway 133, the grouping of terrestrial base stations through the above satellite ID and the like is impossible. Therefore, the above solution of sharing satellite ID and the like among terrestrial base stations is practical. On the other hand, since the so-called "regenerative" gateway 133 can group terrestrial base stations, the terrestrial base station list sharing unit 321 may not be required in addition to the gateway 133.

The available power sharing unit 322 is used to share the available power of the communication satellite 131 estimated by the available power estimation unit 31 among the terrestrial base stations (111A-111C, 121 and the like) included in the list shared by the terrestrial base station list sharing unit 321. This allows each terrestrial base station 111A-111C and 121 to recognize the available power of the communication satellite 131. Note that if the gateway 133 is a regenerative type and the like, the available power sharing unit 322 may not be necessary, and the gateway 133 may recognize the available power of the communication satellite 131 and lead subsequent processes such as power comparison described below.

The communication-related information sharing unit 323 is used to share the communication-related information or communication load information concerning the communication that the communication device (2A-2C and the like) connected to each terrestrial base station (111A-111C, 121 and the like) connected to the gateway 133 performs with the communication satellite 131, among the terrestrial base stations (111A-111C, 121 and the like) included in the list shared by the terrestrial base station list sharing unit 321. This allows each terrestrial base station (111A-111C, 121 and the like) to recognize the communication that the communication device connected to other terrestrial base station performs with the communication satellite 131.

Examples of the communication-related information include the communication volume, required communication speed, required quality of service (QoS), communication type (e.g. data communication, voice call, priority communication such as emergency report, VoNR and VoLTE), RSRP (Reference Signal Received Power), channel state information (CSI) including CQI (Channel Quality Indicator) and the like.

Figure 4:
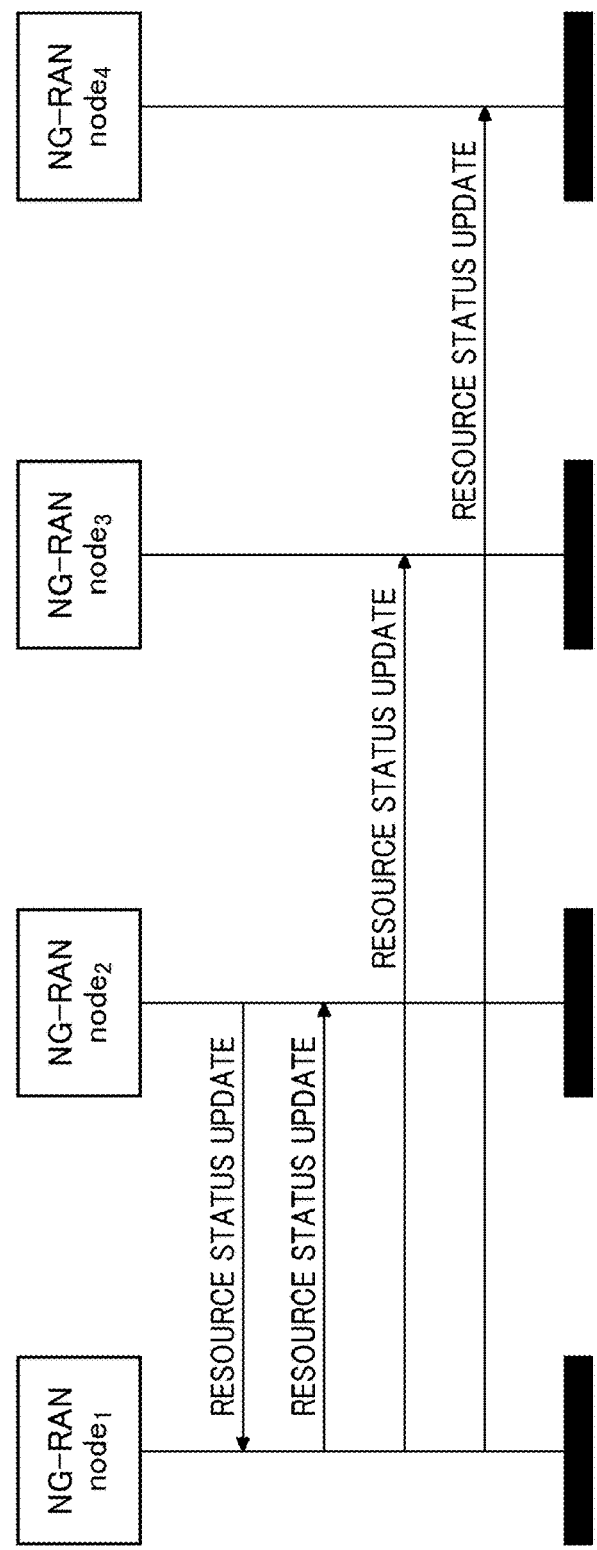
FIG. 4 is a schematic representation of an example of the sharing of communication-related information among terrestrial base stations by the communication-related information sharing unit.

As shown schematically in FIG. 4, the sharing of the communication-related information among the terrestrial base stations by the communication-related information sharing unit 323 can be done according to "RESOURCE STATUS UPDATE" defined in 5G communication and the like. "NG-RAN node$_1$" to "NG-RAN node$_4$" in the figure represent 5G base stations, and each 5G base station can send "RESOURCE STATUS UPDATE" to each other, thereby the latest communication-related information is shared among all 5G base stations. One terrestrial base station that shares the communication-related information with other terrestrial base stations preferably simultaneously sends or multicasts the "RESOURCE STATUS UPDATE" including the communication-related information, addressed to all other terrestrial base stations included in the list shared by the terrestrial base station list sharing unit 321. This can be easily achieved by including all other terrestrial base stations (target cells) in the address or "target cell ID" of the "RESOURCE STATUS UPDATE". Note that if the gateway 133 is a regenerative type and the like, the communication-related information sharing unit 323 may not be necessary, and the gateway 133 may recognize the communication-related information of each terrestrial base station and lead subsequent processes such as required total power estimation described below.

The required total power estimation unit 33 estimates the total power required by the communication satellite 131 for communication with each communication device (2A-2C and the like) connected to the gateway 133. In other words, the required total power estimation unit 33 estimates the total power required by the communication satellite 131 for communication with the communication device (2A-2C and the like) connected to the terrestrial base stations (111A-111C, 121 and the like) included in the list shared by the terrestrial base station list sharing unit 321. Specifically, the required total power estimation unit 33 estimates the total power required by the communication satellite 131 based on the communication-related information of each terrestrial base station shared by the communication-related information sharing unit 323. To estimate the total power required by the communication satellite 131, it is necessary to estimate the power required by the communication satellite 131 for communication with each individual communication device (2A-2C and the like). The individual power estimation is further broken down into estimating the number of Physical Resource Blocks (PRBs) required for communication and estimating the required power per PRB.

In the estimation of the required number of PRBs, the communication-related information (communication volume, required communication speed, required QoS, communication type, CSI and the like) shared by the communication-related information sharing unit 323 is used in whole or in part. For example, the higher the communication volume, the greater the number of PRBs required; the higher the required communication speed, the greater the number of PRBs required (per unit time); the higher the required QoS, the greater the number of PRBs required (or PRBs are preferentially assigned to communications with higher required QoS than to other communications); if the communication type is priority communication such as emergency report, VoNR, VoLTE and the like, the number of PRBs required is higher (or PRBs are preferentially assigned to the priority communications over other communications); and if the channel condition based on CSI is poor, the number of PRBs required is higher. Similarly, in the estimation of the required power per PRB, the communication-related information shared by the communication-related information sharing unit 323 is also used in whole or in part. For example, if the required QoS is high, the required power per PRB is larger, and if the communication type is priority communication such as emergency report, VoNR, VoLTE and the like, the required power per PRB is larger, and if the channel condition based on CSI is poor, the required power per PRB is larger. Multiplying the number of required PRBs estimated above by the required power per PRB estimated above, the individual power required by the communication satellite 131 for communication with each communication device can be obtained. And, the required total power of the communication satellite 131 can be obtained by summing the individual powers over all communication devices.

The power comparison unit 34 compares the required total power estimated by the required total power estimation unit 33 with the available power of the communication satellite 131 shared by the available power sharing unit 322. If the required total power is less than or equal to the available power, the communication satellite 131 can manage the communication with each communication device (2A-2C and the like) connected to the gateway 133 within the range of the current available power. On the other hand, if the required total power is more than the available power, the communication satellite 131 cannot manage the requested communication with the current available power, and subsequent processes such as the communication mode change described below is necessary.

The power comparison unit 34 may compare the required power per PRB with the available power. The required power per PRB is calculated by dividing the required total power estimated by the required total power estimation unit 33 by the required total number of PRBs (the sum of the individually estimated required number of PRBs). The available power per PRB is calculated by dividing the available power estimated by the available power estimation unit 31 by the required total number of PRBs (or the number of free PRBs available for scheduling for the communication satellite 131).

The communication-related information acquisition unit 35, the priority change unit 36, and the communication mode change unit 37 perform the processes described below, at least when the total power required by the communication satellite 131 is more than the available power as a result of the comparison by the power comparison unit 34. Therefore, if the required total power of the communication satellite 131 is less than the available power, the communication-related information acquisition unit 35, the priority change unit 36, and the communication mode change unit 37 do not have to perform the processes described below.

The communication-related information acquisition unit 35 is used to acquire the communication-related information concerning the communication that each communication device (2A-2C and the like) connected to the gateway 133 performs with the communication satellite 131. In the example in FIG. 3, the communication-related information acquisition unit 35 acquires all or portion of the communication-related information already shared by the communication-related information sharing unit 323.

The priority change unit 36 lowers the priority of at least one of each communication device (2A-2C and the like) based on the communication-related information acquired by the communication-related information acquisition unit 35. For example, the priority level of the communication device that performs communications with high required QoS or priority communications such as emergency report, VoNR, VoLTE and the like is not lowered, while the priority level of the communication device that performs other communications is lowered.

The communication mode change unit 37 changes communication mode between at least one communication device (2A-2C and the like) connected to the gateway 133 and the communication satellite 131, so that the required total power estimated by the required total power estimation unit 33 becomes less than the available power estimated by the available power estimation unit 31. Specifically, the communication mode change unit 37 changes the communication mode between at least one of the communication devices whose priority is lowered by the priority change unit 36 and the communication satellite 131. Examples of changing the communication mode include: delaying the communication of the communication device to be changed to a later time than that of the communication device not to be changed, reducing the number of PRBs allocated to the communication device to be changed from the number of required PRBs estimated by the required total power estimation unit 33, reducing the power per PRB allocated to the communication device to be changed from the required power per PRB estimated by the required total power estimation unit 33, reducing the communication volume of the communication device to be changed, slowing down the communication speed of the communication device to be changed, lowering the required QoS of the communication device to be changed, increasing the tolerance for CSI of the communication device to be changed, and so on.

According to the above embodiment, when the total power required by the communication satellite 131 for communication with each communication device (2A-2C and the like) on the ground is more than the available power of the communication satellite 131, the communication mode change unit 37 changes the communication mode between at least one communication device and the communication satellite 131 to reduce the required total power below the available power, so that the power of the communication satellite 131 can be used efficiently.

Figure 5:
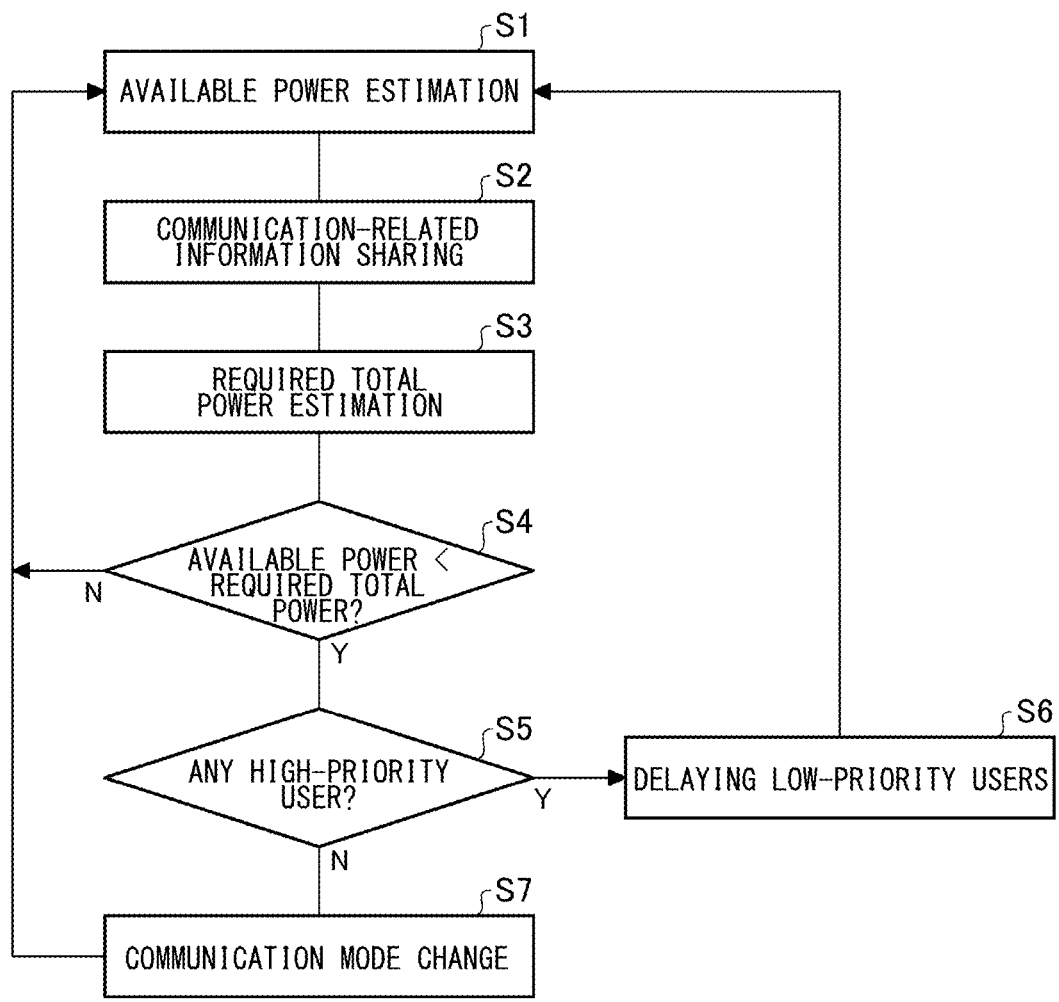
FIG. 5 is a flowchart of communication control processes by the communication control apparatus.

FIG. 5 is a flowchart of the communication control processes by communication control apparatus 3. "S" in the flowchart description refers to a step or process. In S1, the available power estimation unit 31 estimates the available power of the communication satellite 131 based on ephemeris information and the like of the communication satellite 131. In S2, the communication-related information sharing unit 323 shares the communication-related information or communication load information concerning the communication that the communication device (2A-2C and the like) connected to each terrestrial base station (111A-111C, 121 and the like) connected to the gateway 133 performs with the communication satellite 131, among the terrestrial base stations (111A-111C, 121 and the like) included in the list shared by the terrestrial base station list sharing unit 321. In S3, the required total power estimation unit 33 estimates the total power required by the communication satellite 131 for communication with each communication device (2A-2C and the like) connected to the gateway 133, based on the communication-related information of each terrestrial base station shared in S2.

In S4, the power comparison unit 34 compares the required total power estimated in S3 with the available power estimated in S1, and judges whether or not the required total power is more than the available power. If S4 is judged to be No, the communication satellite 131 can manage the communication with each communication device (2A-2C and the like) connected to the gateway 133 within the range of the current available power, so the later processes S5-S7 are skipped and return to S1. If S4 is judged to be Yes, proceed to S5, where the communication-related information acquired by the communication-related information acquisition unit 35 is used to judge the presence or absence of a high priority user. For example, if there is a communication device that performs communication with high required QoS and/or priority communication such as emergency report, VoNR, VoLTE and the like, the communication-related information acquisition unit 35 judges the user of such communication device to be a high priority user.

If S5 is determined to be Yes, proceed to S6, where the priority change unit 36 lowers the priority of the communication devices of users other than the high-priority user recognized in S5, and the communication mode change unit 37 delays the communication of the communication device of the low-priority users to a later time than that of the communication device of the high-priority user recognized in S5, so that the required total power estimated in S3 becomes less than the available power estimated in S1 (so that the S4 is judges to be No). Then the process returns to S1. If S5 is determined to be No, the process proceeds to S7, and the communication mode change unit 37 changes communication mode between at least one communication device (2A-2C and the like) connected to the gateway 133 and the communication satellite 131, so that the required total power estimated in S3 becomes less than the available power estimated in S1 (so that the S4 is judges to be No). Then the process returns to S1.

Figure 6:
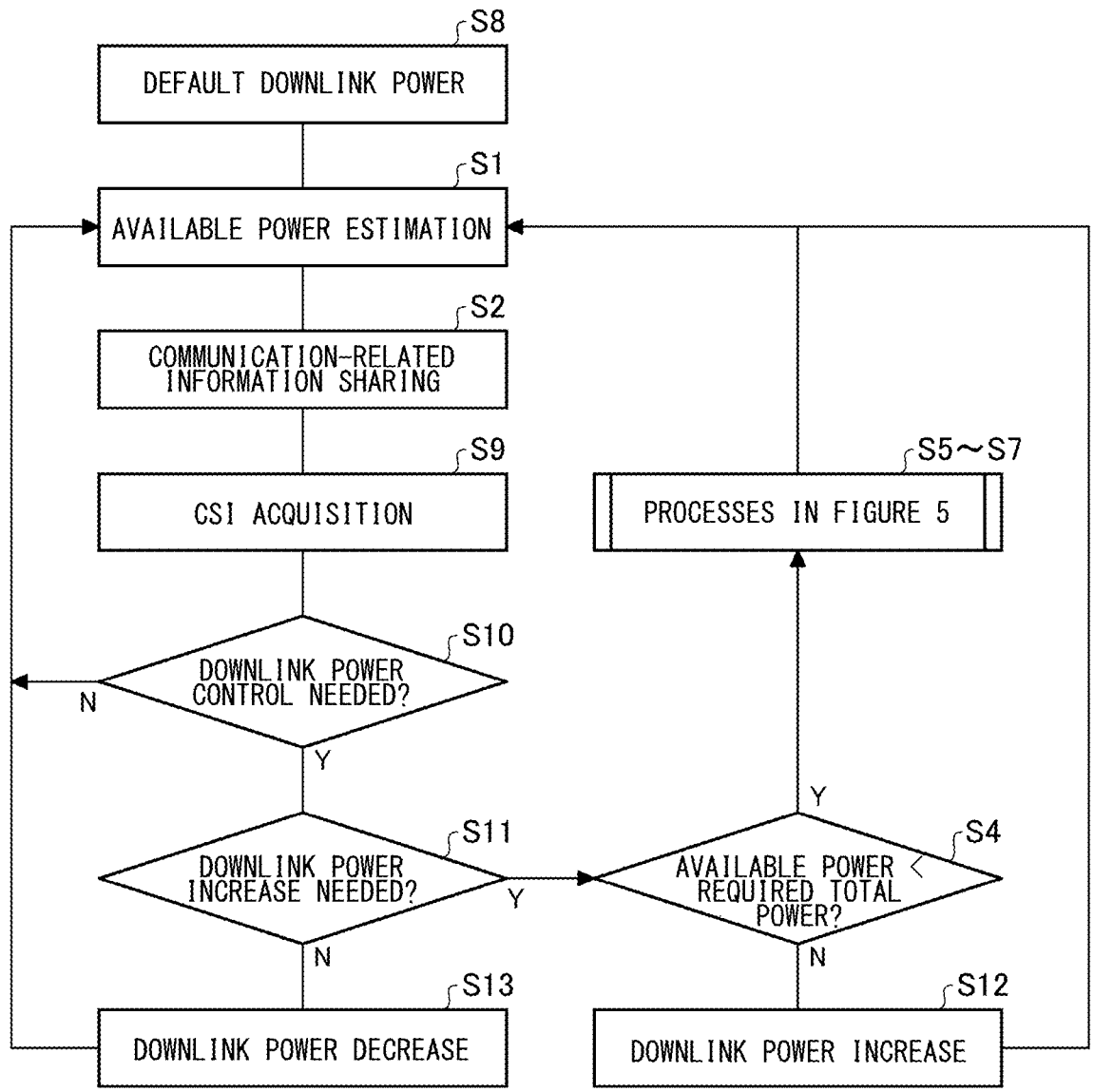
FIG. 6 is a flowchart of the power control processes of communication satellite by the communication control apparatus.

FIG. 6 is a flowchart of the power control processes of the communication satellite 131 by the communication control apparatus 3. Steps or processes similar to those in FIG. 5 are marked with the same signs and the duplicated descriptions will be omitted. When the communication satellite 131 communicates with communication devices (2A-2E and the like) on the ground, power of the communication satellite 131 will be consumed both in the uplink communication to receive data from communication device on the ground and in the downlink communication to send data to communication device on the ground. However, in general, the power consumption during the downlink communication is dominant. Thus, the power control processes during the downlink communication will be mainly described in relation to the figure. As shown in FIG. 2, the downlink communication from the communication satellite 131 is categorized into two types: One type is for the communication devices (2D, 2E and the like) in the satellite communication cell 132 provided by the communication satellite 131; and another type is for the communication devices (2A-2C and the like) in TNs connected to the gateway 133.

In the present embodiment, by recognizing the communication-related information or communication load information of the communication devices (2A-2C and the like) in the TN, the power of the communication satellite 131 (hereinafter also referred to as downlink power) can be effectively controlled for: the downlink communication that the communication devices (2A-2C and the like) in the TN performs with the communication devices (2D, 2E and the like) in the satellite communication cell 132 via the gateway 133 and the communication satellite 131; and the downlink communication that the communication devices (2D, 2E and the like) in the satellite communication cell 132 performs with the communication devices (2A-2C and the like) in the TN via the communication satellite 131 and the gateway 133 in response to request by the communication devices (2A-2C and the like) in the TN.

If we take a look at the communication between the communication devices (2A-2C and the like) in the TN and the communication satellite 131, there are two cases of communications as outlined above: in one case, the uplink communication from the communication devices (2A-2C and the like) in the TN to the communication satellite 131 (and the downlink communication from the communication satellite 131 to the communication devices in the satellite communication cell 132) is performed; and in another case, the downlink communication from the communication satellite 131 to the communication devices (2A-2C and the like) in the TN (and the uplink communication from the communication devices in the satellite communication cell 132 to the communication satellite 131) is performed. In either case, by changing the communication mode between the communication devices (2A-2C and the like) in the TN and the communication satellite 131, the power of the communication satellite 131 can be effectively controlled for the downlink communications that originates on the satellite communication cell 132 side or the TN side.

In S8, the communication satellite 131 performs downlink communication with the default downlink power. In S1, the available power estimation unit 31 estimates the available power of the communication satellite 131 based on ephemeris information and the like of the communication satellite 131. In S2, the communication-related information sharing unit 323 shares the communication-related information or communication load information concerning the uplink communication or downlink communication that the communication device (2A-2C and the like) in the TN performs with the communication satellite 131, among the terrestrial base stations (111A-111C, 121 and the like) on the TN side. In S9, the communication satellite 131 acquires CSI such as RSRP and CQI, which indicate path loss and the like related to the downlink communication, from the communication-related information shared in S2. In S10, the communication satellite 131 judges whether or not the downlink power needs to be controlled (increased or decreased). For example, if the channel state of the downlink communication based on the CSI obtained in S9 is significantly worse than expected, a larger downlink power is required, therefore the judgment in S10 should be Yes. Conversely, if the channel state of the downlink communication based on the CSI obtained in S9 is significantly better than expected, there is little problem even if the downlink power is reduced, therefore the judgment in S10 should be also Yes. In case judgment in S10 is No, the process returns to S1.

If S10 is determined to be Yes, proceed to S11, where the communication satellite 131 determines whether or not an increase of downlink power is required. If the channel state of the downlink communication is significantly worse than expected and the like as described above, S11 is determined to be Yes, and proceed to S4. In S4, the power comparison unit 34 compares the required total power (S3 in FIG. 5) with increase of the downlink power with the available power estimated in S1, and judges whether or not the required total power is more than the available power. If S4 is determined to be Yes, increasing the downlink power will cause the required total power to exceed the available power, therefore the downlink power is adjusted or redistributed among each communication device by changing the communication mode similar to S5-S7 in FIG. 5. Then the process returns to S1. If S4 is determined to be No, the required total power remains below the available power even if the downlink power is increased. Then in S12, the communication satellite 131 increases the downlink power mainly for high priority users. Then the process returns to S1. If S11 is determined to be No, proceed to S13 where the communication satellite 131 decreases the downlink power mainly for low priority users. Then the process returns to S1.

The present disclosure has been described above based on embodiments. It is understood by those skilled in the art that the embodiments are exemplary and that various variations are possible in the combination of each component and/or each process thereof, and that such variations are also within the scope of the present disclosure.

The functional configuration of each device described in the embodiment can be realized by hardware resources or software resources, or by the cooperation of hardware resources and software resources. As hardware resources, processors, ROM, RAM, and other LSIs can be used. Operating systems, applications, and other programs can be used as software resources.

The present disclosure relates to communication control technology in communication system.

What is claimed is:

1. A communication control apparatus for a communication system with a ground station, which is at least partly installed on the ground and can communicate with a communication device, and a flying base station, which can communicate with the ground station, comprising:
    an available power estimation unit to estimate available power of the flying base station;
    a required total power estimation unit to estimate total power required by the flying base station for communication with each communication device connected to the ground station; and
    a communication mode change unit to change communication mode between at least one communication device and the flying base station, at least when the total power is more than the available power, so that the total power becomes less than the available power.

2. The communication control apparatus according to claim 1, wherein the communication system further comprises a terrestrial base station installed on the ground and capable of communicating with the communication device, and the ground station is a gateway that connects the terrestrial base station and the flying base station to establish communication between the communication device connected to the terrestrial base station and the flying base station.

3. The communication control apparatus according to claim 2, wherein the available power estimation unit is provided in the gateway and shares the estimated available power with the terrestrial base station connected to the gateway.

4. The communication control apparatus according to claim 2, wherein a list sharing unit is further provided to share a list of the terrestrial base stations connected to the flying base station via the gateway among the terrestrial base stations as information associated with the flying base station, and the required total power estimation unit estimates the total power required by the flying base station for communication with the communication device connected to the terrestrial base station included in the list.

5. The communication control apparatus according to claim 2, wherein one terrestrial base station connected to the gateway shares the communication-related information concerning the communication that the communication device connected to the one terrestrial base station performs with the flying base station with other terrestrial base station connected to the gateway, and the required total power estimation unit estimates the total power required by the flying base station based on the communication-related information shared among the terrestrial base stations.

6. The communication control apparatus according to claim 1, further comprising:
    a communication-related information acquisition unit that acquires communication-related information concerning the communication that each communication device connected to the ground station performs with the flying base station, and
    a priority change unit that lowers the priority of at least one of the communication devices based on the communication-related information, wherein
    the communication mode change unit changes the communication mode between at least one of the communication devices whose priority is lowered by the priority change unit and the flying base station.

7. The communication control apparatus according to claim 1, wherein the available power estimation unit estimates the available power of the flying base station based on the ephemeris information of the flying base station.

8. The communication control apparatus according to claim 1, wherein
    the flying base station provides a flying communication cell on the ground and
    one communication device in the flying communication cell can communicate with other communication device connected to the ground station via the flying base station and the ground station.

9. The communication control apparatus according to claim 1, wherein the flying base station is a communication satellite flying in outer space.

10. A communication control method for a communication system with a ground station, which is at least partly installed on the ground and can communicate with a communication device, and a flying base station, which can communicate with the ground station, comprising:
    estimating available power of the flying base station;
    estimating total power required by the flying base station for communication with each communication device connected to the ground station; and
    changing communication mode between at least one communication device and the flying base station, at least when the total power is more than the available power, so that the total power becomes less than the available power.

11. A non-transitory computer-readable medium storing a communication control program for a communication system with a ground station, which is at least partly installed on the ground and can communicate with a communication device, and a flying base station, which can communicate with the ground station, causing a computer to perform:
    estimating available power of the flying base station;
    estimating total power required by the flying base station for communication with each communication device connected to the ground station; and
changing communication mode between at least one communication device and the flying base station, at least when the total power is more than the available power, so that the total power becomes less than the available power.

* * * * *